(12) United States Patent
Carlander et al.

(10) Patent No.: US 12,128,885 B2
(45) Date of Patent: Oct. 29, 2024

(54) METHOD AND SYSTEM FOR DETERMINING A USABLE DISTANCE IN FRONT OF A VEHICLE

(71) Applicant: Aptiv Technologies AG, Schaffhausen (CH)

(72) Inventors: Markus Pär Oscar Carlander, Hisings-Kärra Gothenburg (SE); Adam Mats John Lilja, Gothenburg (SE)

(73) Assignee: Aptiv Technologies AG, Schaffhausen (CH)

( * ) Notice: Subject to any disclaimer, the term of this patent is extended or adjusted under 35 U.S.C. 154(b) by 342 days.

(21) Appl. No.: 17/195,536

(22) Filed: Mar. 8, 2021

(65) Prior Publication Data
US 2021/0300353 A1 Sep. 30, 2021

(30) Foreign Application Priority Data
Mar. 30, 2020 (EP) ..................... 20166617

(51) Int. Cl.
*B60W 30/095* (2012.01)
*B60W 30/09* (2012.01)
*G06V 20/58* (2022.01)

(52) U.S. Cl.
CPC .......... *B60W 30/095* (2013.01); *B60W 30/09* (2013.01); *G06V 20/58* (2022.01);
(Continued)

(58) Field of Classification Search
CPC ............... B60W 30/09; B60W 30/095; B60W 2554/4043; B60W 2254/4049; G06V 20/58
See application file for complete search history.

(56) References Cited

U.S. PATENT DOCUMENTS 7,124,027 B1 * 10/2006 Ernst, Jr. ............... B60W 30/09
701/301
7,189,769 B2 3/2007 Cody et al.
(Continued)

FOREIGN PATENT DOCUMENTS

CN 103559791 A 2/2014
CN 111401208 A 7/2020
(Continued)

OTHER PUBLICATIONS

"Extended European Search Report", EP Application No. 20164443.2, Sep. 9, 2020, 10 pages.
(Continued)

*Primary Examiner* — Jelani A Smith
*Assistant Examiner* — Toya Pettiegrew
(74) *Attorney, Agent, or Firm* — Harness, Dickey & Pierce, P.L.C.

(57) ABSTRACT

A method for determining a usable distance between a host vehicle and a moving object is provided. According to the method, a current obstacle free distance is detected in front of the host vehicle, wherein the current obstacle free distance is limited by a current position of the moving object, and a current velocity of the moving object is determined. An extension distance is estimated based on the current velocity of the moving object, and the usable distance is determined based on the current obstacle free distance and the extension distance.

19 Claims, 4 Drawing Sheets

(52) U.S. Cl.
CPC .............. B60W 2420/408 (2024.01); B60W 2554/4043 (2020.02); B60W 2554/4049 (2020.02)

(56) References Cited

U.S. PATENT DOCUMENTS

| | | | |
|---|---|---|---|
| 8,930,060 | B1 | 1/2015 | Lu et al. |
| 9,199,668 | B2 | 12/2015 | Zeng et al. |
| 9,470,777 | B2 | 10/2016 | Arage |
| 9,738,278 | B2 | 8/2017 | Hasberg et al. |
| 10,303,178 | B1 | 5/2019 | Gutmann |
| 10,303,492 | B1 | 5/2019 | Wagner et al. |
| 10,430,641 | B2 | 10/2019 | Gao |
| 10,564,647 | B2 | 2/2020 | Balaghiasefi et al. |
| 10,885,353 | B2 | 1/2021 | Watanabe et al. |
| 10,909,411 | B2 | 2/2021 | Sano et al. |
| 11,016,492 | B2 | 5/2021 | Gier et al. |
| 11,073,832 | B1 | 7/2021 | Gutmann |
| 11,132,611 | B2 | 9/2021 | Sano et al. |
| 11,195,028 | B2 | 12/2021 | Lee et al. |
| 11,222,438 | B2 | 1/2022 | Sano et al. |
| 11,250,288 | B2 | 2/2022 | Sano et al. |
| 11,276,189 | B2 | 3/2022 | Niesen et al. |
| 11,353,577 | B2 | 6/2022 | Liu et al. |
| 11,393,097 | B2 | 7/2022 | Brunner et al. |
| 11,475,678 | B2 | 10/2022 | Myeong et al. |
| 11,530,921 | B2 | 12/2022 | Nimmagadda et al. |
| 11,544,940 | B2 | 1/2023 | Baik et al. |
| 11,555,927 | B2 | 1/2023 | Huang et al. |
| 2007/0005306 | A1 | 1/2007 | Foessel |
| 2009/0143951 | A1* | 6/2009 | Takahashi ............ B60W 30/09 701/70 |
| 2012/0053755 | A1 | 3/2012 | Takagi |
| 2012/0109421 | A1* | 5/2012 | Scarola ................. G08G 1/22 701/2 |
| 2015/0012204 | A1 | 1/2015 | Breuer et al. |
| 2015/0353062 | A1* | 12/2015 | Breuer .................... B60T 7/22 701/70 |
| 2015/0353083 | A1 | 12/2015 | Hasberg et al. |
| 2016/0116916 | A1 | 4/2016 | Pink et al. |
| 2017/0083021 | A1 | 3/2017 | Balaghiasefi et al. |
| 2017/0344844 | A1 | 11/2017 | Sano et al. |
| 2017/0344888 | A1 | 11/2017 | Sano et al. |
| 2017/0345182 | A1 | 11/2017 | Sano et al. |
| 2018/0074507 | A1 | 3/2018 | Gao et al. |
| 2018/0188059 | A1 | 7/2018 | Wheeler et al. |
| 2018/0189599 | A1 | 7/2018 | Sano et al. |
| 2018/0239969 | A1 | 8/2018 | Lakehal-Ayat et al. |
| 2018/0329034 | A1 | 11/2018 | Bilik et al. |
| 2018/0350086 | A1 | 12/2018 | Sweet, III et al. |
| 2019/0050649 | A1 | 2/2019 | Watanabe et al. |
| 2019/0271549 | A1 | 9/2019 | Zhang et al. |
| 2019/0286153 | A1 | 9/2019 | Rankawat et al. |
| 2019/0318176 | A1 | 10/2019 | Sano et al. |
| 2019/0340775 | A1 | 11/2019 | Lee et al. |
| 2019/0346854 | A1 | 11/2019 | Slutsky et al. |
| 2019/0384302 | A1* | 12/2019 | Silva ..................... G06V 10/764 |
| 2020/0103523 | A1 | 4/2020 | Liu et al. |
| 2020/0139959 | A1 | 5/2020 | Akella et al. |
| 2020/0183011 | A1 | 6/2020 | Lin et al. |
| 2020/0217950 | A1 | 7/2020 | Unnikrishnan et al. |
| 2020/0218907 | A1 | 7/2020 | Baik et al. |
| 2020/0218908 | A1 | 7/2020 | Lee et al. |
| 2020/0218909 | A1 | 7/2020 | Myeong et al. |
| 2020/0218913 | A1 | 7/2020 | Unnikrishnan et al. |
| 2020/0219264 | A1 | 7/2020 | Brunner et al. |
| 2020/0240795 | A1 | 7/2020 | Nomura |
| 2020/0249356 | A1 | 8/2020 | Huang et al. |
| 2020/0250485 | A1 | 8/2020 | Nagori et al. |
| 2020/0298853 | A1* | 9/2020 | Bast ....................... G08G 1/166 |
| 2020/0334544 | A1 | 10/2020 | Liu et al. |
| 2020/0356415 | A1 | 11/2020 | Goli |
| 2020/0361489 | A1 | 11/2020 | Park et al. |
| 2020/0378766 | A1 | 12/2020 | Omari et al. |
| 2020/0391729 | A1 | 12/2020 | Liu et al. |
| 2021/0101624 | A1 | 4/2021 | Philbin et al. |
| 2021/0131823 | A1 | 5/2021 | Giorgio et al. |
| 2021/0181750 | A1 | 6/2021 | Gogna et al. |
| 2021/0188286 | A1* | 6/2021 | Ma ..................... G01C 21/3407 |
| 2021/0278853 | A1 | 9/2021 | Gier et al. |
| 2021/0291816 | A1 | 9/2021 | Lilja et al. |
| 2021/0300353 | A1 | 9/2021 | Carlander et al. |
| 2021/0331679 | A1 | 10/2021 | Lilja et al. |
| 2021/0333380 | A1 | 10/2021 | Lilja et al. |
| 2021/0394761 | A1 | 12/2021 | Steyer et al. |
| 2022/0057232 | A1 | 2/2022 | Shen et al. |
| 2022/0180537 | A1 | 6/2022 | Niesen et al. |
| 2022/0373353 | A1 | 11/2022 | Ding |

FOREIGN PATENT DOCUMENTS

| | | |
|---|---|---|
| DE | 102009009047 A1 | 8/2010 |
| DE | 102009022588 | 12/2010 |
| DE | 102016007630 | 12/2017 |
| DE | 102017217972 A1 | 4/2019 |
| DE | 102017126388 A1 | 5/2019 |
| DE | 102019205008 | 7/2020 |
| EP | 3364534 A1 | 8/2018 |
| GB | 2560322 A | 9/2018 |
| JP | 2018138402 | 9/2018 |
| WO | 2020140047 A1 | 7/2020 |

OTHER PUBLICATIONS

"Extended European Search Report", EP Application No. 20171489.6, Sep. 18, 2020, 11 pages.

"Extended European Search Report", EP Application No. 20171491.2, Sep. 28, 2020, 9 pages.

Casapietra, et al., "Building a Probabilistic Grid-based Road Representation from Direct and Indirect Visual Cues", Jun. 2015, 8 pages.

Kunz, et al., "Fast Collision Checking with a Frenet Obstacle Grid for Motion Planning", Jun. 2014, pp. 95-104.

Nuss, "Consistent Environmental Modeling by use of Occupancy Grid Maps, Digital Road Maps, and Multi-Object Tracking", Jun. 2014, 7 pages.

Sundram, et al., "Development of a Miniature Robot for Multi-robot Occupancy Grid Mapping", Jul. 2018, 7 pages.

Weiss, "Robust Driving Path Detection in Urban and Highway Scenarios Using a Laser Scanner and Online Occupancy Grids", Jul. 2007, pp. 184-189.

"Extended European Search Report", EP Application No. 21157127.8, Jul. 9, 2021, 10 pages.

Joubert, et al., "Pose Uncertainty in Occupancy Grids through Monte Carlo Integration", Aug. 17, 2014, 6 pages.

Jungnickel, et al., "Efficient Automotive Grid Maps using a Sensor Ray based Refinement Process", Jul. 9, 2021, 8 pages.

"Extended European Search Report", EP Application No. 20166617.9, Oct. 7, 2020, 7 pages.

"Extended European Search Report", EP Application No. 20209230.0, May 4, 2021, 10 pages.

"Extended European Search Report", EP Application No. 20211232.2, May 25, 2021, 10 pages.

"Extended European Search Report", EP Application No. 20214293.1, May 27, 2021, 10 pages.

Aihara, et al., "Free-Space Estimation for Self-Driving System Using Millimeter Wave Radar and Convolutional Neural Network", Mar. 2019, 4 pages.

BestTong ABS Plastic Junction Box . . . , available in Amazon.com, First available date Dec. 21, 2013, [Dec. 8, 2021], Available from the internet URL: https://www.amazon.com/dp/B016FCZPTM/ref=cm_sw_em_r_mt_dp_BTHQC2BSJT2JGAAAPJM4?_encoding=UTF8&psc=1 (Year: 2013).

C. Pfeffer, R. Feger, C. Wagner, and A. Stelzer, "FMCW MIMO radar system for frequency-division multiple TX-beamforming," IEEE Trans. Microw. Theory Techn., vol. 61, No. 12, pp. 42624274, Dec. 2013.

Chakraborty, et al., "An Overview of Face Liveness Detection", Apr. 2004, 15 pages.

(56) References Cited

OTHER PUBLICATIONS

Foroughi, et al., "Free Space Grid for Automotive Radar Sensors", Sep. 2015, pp. 249-256.
Gorzelany, et al., "Safety Last? Driver-Assist Features That Are Most Often Switched Off", Jul. 7, 2000, 5 pages.
Jianyu Chen, et al., "Constrained Iterative LQR for On-Road Autonomous Driving Motion Planning", 2017 IEEE 20th International Conference on Intelligent Transportation Systems (ITSC), Oct. 2017, 7 pages.
Jun Ma, et al., "Alternating Direction Method of Multipliers for Constrained Iterative LQR in Autonomous Driving", Nov. 1, 2020, 9 pages.
Li, et al., "High Resolution Radar-based Occupancy Grid Mapping and Free Space Detection", Mar. 2018, pp. 70-81.
Liang, et al., "PolyTransform: Deep Polygon Transformer for Instance Segmentation", Jan. 16, 2021, 10 pages.
Ling, et al., "Shooting and Bouncing Rays: Calculating the RCS of an Arbitrarily Shaped Cavity", Feb. 1989, pp. 194-205.
Liou, et al., "Modeling word perception using the Elman network", Jul. 2008, 9 pages.
Pyo, et al., "Front Collision Warning based on Vehicle Detection using CNN", International SoC Design Conference, 2016, Oct. 2016.
Qi, et al., "PointNet++: Deep Hierarchical Feature Learning on Point Sets in a Metric Space", Jun. 7, 2017, 14 pages.
Qi, et al., "Volumetric and Multi-View CNNs for Object Classification on 3D Data", Apr. 29, 2016', 14 pages.
Suzuki, et al., "Topological Structural Analysis of Digitized Binary Images by Border Following", Apr. 1985, pp. 32-46.
Zhao, et al., "Pyramid Scene Parsing Network", Apr. 27, 2017, 11 pages.
Zou, "Free Space Detection Based on Occupancy Gridmaps", Apr. 2012, 70 pages.

\* cited by examiner

METHOD AND SYSTEM FOR DETERMINING A USABLE DISTANCE IN FRONT OF A VEHICLE

CROSS-REFERENCE TO RELATED APPLICATION

This application claims priority to European Patent Application Number 20166617.9, filed Mar. 30, 2020, the disclosure of which is hereby incorporated by reference in its entirety herein.

BACKGROUND

The present disclosure relates to a method and a system for determining a usable distance between a host vehicle and a moving object.

Advanced driver assistance systems (ADAS) have been developed to support drivers in order to drive a host vehicle more safely and comfortably. These systems comprise, for example, active control of Electronic Power Assistance Steering (EPAS) like Lane Keeping Assistance (LKA), Lane Change Warning (LCW) and Side Collision Warning (SCW).

Due to safety reasons, an obstacle free distance or space in a lane in front of the host vehicle needs to be above a certain predetermined limit. The free distance or space in front of the host vehicle is usually determined by visual and/or radar systems which are installed on the host vehicle.

When determining the free distance or space, the shortest distance to an obstacle is usually detected without considering whether the obstacle or object in front of the vehicle is moving or stationary. For example, if the detected obstacle is a further vehicle moving in the same lane in front of the host vehicle with at least the same velocity, the actual safety distance required for the assistance systems to perform properly is longer than the predetermined safety distance considering stationary objects only. This is due to the fact that the further vehicle will not be at the detected position when the host vehicle will arrive there.

As a consequence, the assistance systems will not be enabled (or will be deactivated if they were enabled before) if the detected obstacle free distance or space is smaller than the predetermined limit, although it is actually not required to set the assistance systems aside for safety reasons. Instead, the safety of the host vehicle could be improved in such a situation with respect to an environment comprising moving objects if the assistance systems mentioned above were activated. This holds true although the actual detected obstacle free distance might be somewhat below the predetermined safety distance taking into account stationary objects only. In other words, it may be more dangerous to leave these assistance systems in a deactivated state than having such systems activated in a surrounding in which moving objects slightly undershoot the predetermined safety distance.

Accordingly, there is a need to provide a method and a system for determining an actually usable free distance with respect to a moving object in front of a host vehicle.

SUMMARY

The present disclosure provides a computer implemented method, a computer system and a non-transitory computer readable medium according to the independent claims. Embodiments are given in the subclaims, the description and the drawings.

In one aspect, the present disclosure is directed at a computer implemented method for determining a usable distance between a host vehicle and a moving object. According to the method, a current obstacle free distance is detected in front of the host vehicle via a detection system of the host vehicle, wherein the current obstacle free distance is limited by a current position of the moving object, and a current velocity of the moving object is determined via the detection system. An extension distance is estimated based on the current velocity of the moving object via a prediction module of the host vehicle, and the usable distance is determined based on the current obstacle free distance and the extension distance via the prediction module.

The usable distance may be regarded as an effective safety distance in order to decide whether assistance systems like lane keeping assistance (LKA), lane change warning (LCW) and side collision warning (SCW) are to be activated (or should remain activated). The current obstacle free distance which takes into account the "static situation" only at the current instant of time is prolonged by the extension distance which is based on the movement of the vehicle, i.e. based on its current velocity. For example, the usable distance may be the sum of the current obstacle free distance and the extension distance.

Due to the prolongation of the current obstacle free distance by the extension distance, the assistance systems mentioned above will be available for supporting a driver of the host vehicle in situations in which these systems would not be available if the extension distance were not taken into account. Conversely, unnecessary cycles of deactivation and activation can be avoided for the assistance systems.

Therefore, the safety of a driver and further occupants in the host vehicle is improved by increasing the availability of assistance systems in an environment comprising moving objects. However, the dependence of the extension distance on the current velocity of the moving object may be defined in such a manner that a certain safety margin is not exceeded which takes into account sudden changes of the movement (e.g. due to braking and/or steering) of the object under consideration.

The method may comprise one or more of the following features:

The extension distance may be estimated by predicting an emergency braking distance and an emergency steering distance of the moving object, wherein the extension distance may be determined as a minimum of the predicted emergency braking distance and of the predicted emergency steering distance.

The emergency braking distance may be predicted based on a predefined constant deceleration being applied to the moving object for a predetermined time period, and further based on a per time period of the deceleration of the moving predefined jerk being applied to the moving object before and after the predetermined time period, respectively, wherein the jerk is defined as a rate of change object. The predefined jerk may have a respective constant absolute value before and after the predetermined time period, wherein the respective constant absolute values of the jerk before and after the predetermined time period may be equal.

The emergency steering distance of the moving object may be predicted based on a predefined maximum lateral acceleration of the moving object, and it may be further predicted based on a predefined shape of a trajectory of the moving object during emergency braking. The trajectory may include two curves having a predefined radius of curvature being opposite to each other and being smoothly connected such that the trajectory may have a unique tangent at a connection point of the two curves. Furthermore, the emergency steering distance may be determined with respect to a predicted position of the moving object at which the moving object will have moved half its width laterally during emergency steering.

According to an embodiment, the extension distance is estimated by predicting an emergency braking distance and an emergency steering distance of the moving object, wherein the extension distance may be determined as a minimum of the predicted emergency braking distance and the predicted emergency steering distance. Therefore, emergency braking and emergency steering may be taken into account when estimating the extension distance in order to consider the "worst case" for changing the movement of the object. In other words, the current obstacle free distance is prolonged by the extension distance in order to yield the usable distance without sacrificing the safety for the host vehicle since emergency braking and emergency steering of the object (e.g. a preceding vehicle) are taken into account for estimating and therefore restrict the extension distance. The extension distance is determined as a minimum of the two predicted distances since emergency braking and emergency steering need to be considered independently and it is not known in advance which of these will have the stronger effect.

The emergency braking distance may be predicted based on a predefined constant deceleration which is applied to the moving object for a predetermined time period. Therefore, the emergency braking distance is predicted based on a straightforward model assuming a constant deceleration of the moving object. Hence, the prediction or estimation of the safety distances to ensure a proper performance of the assistance systems is facilitated. The predefined constant deceleration may be based on empirical values, e.g. being determined for the emergency braking behavior of known vehicles. In addition, the value for the constant deceleration may depend on the type and/or size of the moving object which is detected in front of the host vehicle. In this case, the constant deceleration may be selected from a group of predefined values including a respective value for each type and/or range for the size of the moving object.

The emergency braking distance may further be predicted based on a predefined jerk being applied to the moving object before and after the predetermined time period, respectively, wherein the jerk is defined as a rate of change per time period of the deceleration of the moving object. The predefined jerk may be a respective constant absolute value before and after the predetermined time period, and these respective constant absolute values for the jerk may be equal.

The predefined jerk may be adapted to the constant deceleration during the predetermined time period such that the jerks describe an increase of the deceleration before the predetermined time period and a decrease of deceleration after the predetermined time period. By using the predefined jerks the straightforward model for describing the emergency braking is refined, wherein predefining the jerk before and after the predetermined time period may also be based on empirical values. Hence, the execution of the method may again be facilitated by using a straightforward model for emergency braking including predefined values.

The emergency steering distance of the moving object may be predicted based on a predefined maximum lateral acceleration of the moving object. That is, due to the emergency steering distance a sudden movement of the object in lateral direction is taken into account, i.e. in a direction perpendicular to the current moving direction of the host vehicle within a lane. The predefined maximum lateral acceleration may describe the "worst case" for the sudden movement of the object in the lateral direction. Therefore, the emergency steering distance may correspond to a safety margin for the extension distance when considering the lateral movement of the object.

The emergency steering distance may further be predicted based on a predefined shape of a trajectory of the moving object during emergency braking. In detail, the trajectory may include two curves having a predefined radius of curvature being opposite to each other and being smoothly connected such that the trajectory has a unique tangent at a connection point of the two curves. Such a predefined shape for the trajectory of the moving object may be regarded as a straightforward model for the movement of the object which may facilitate the prediction and the estimation of the safety distances required for the assistance systems.

The emergency steering distance may be determined with respect to a predicted position of the moving object at which the moving object will have moved half its width laterally during emergency steering. The predicted position of the laterally moving object during emergency steering may therefore define a safety margin again for estimating the extension distance, in this case regarding the lateral movement. It is assumed that the moving object will not be a risky obstacle after the host vehicle will have covered the current obstacle free distance plus the emergency steering distance determined based on the "half width" of the moving object performing emergency steering. Hence, the safety of the host vehicle will not be sacrificed in favor of extending the current obstacle free distance.

In another aspect, the present disclosure is directed at a system for determining a usable distance between a host vehicle and a moving object, said system comprising a perception module and a prediction module. The perception module is configured to detect a current obstacle free distance in front of the host vehicle via a detection system of the host vehicle, wherein the current obstacle free distance is limited by a current position of the moving object, and to determine a current velocity of the moving object via the detection system. The prediction module is configured to predict an extension distance based on the current velocity of the moving object, and to determine the usable distance based on the current obstacle free distance and the extension distance.

As used herein, the term module may refer to, be part of, or include an Application Specific Integrated Circuit (ASIC), an electronic circuit, a combinational logic circuit, a field programmable gate array (FPGA), a processor (shared, dedicated, or group) that executes code, other suitable components that provide the described functionality, or a combination of some or all of the above, such as in a system-on-chip. The term module may include memory (shared, dedicated, or group) that stores code executed by the processor.

In summary, the system according to the disclosure comprises two modules for performing the steps as described above for the corresponding method. Therefore, the benefits and advantages as described above for the method are also valid for the system according to the disclosure.

The detection system of the host vehicle may comprise a visual system and/or a RADAR system and/or a LIDAR system being configured to detect the current obstacle free distance, wherein the RADAR system and/or the LIDAR system may additionally be configured to determine the current velocity of the moving object.

The visual system, the RADAR system and/or the LIDAR system may already be implemented in the host vehicle. Therefore, the current obstacle free distance and the current velocity of the moving object may already be available for other assistance systems. Hence, the system may be implemented at low cost, e.g. by generating suitable software for the perception module and for the prediction module.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
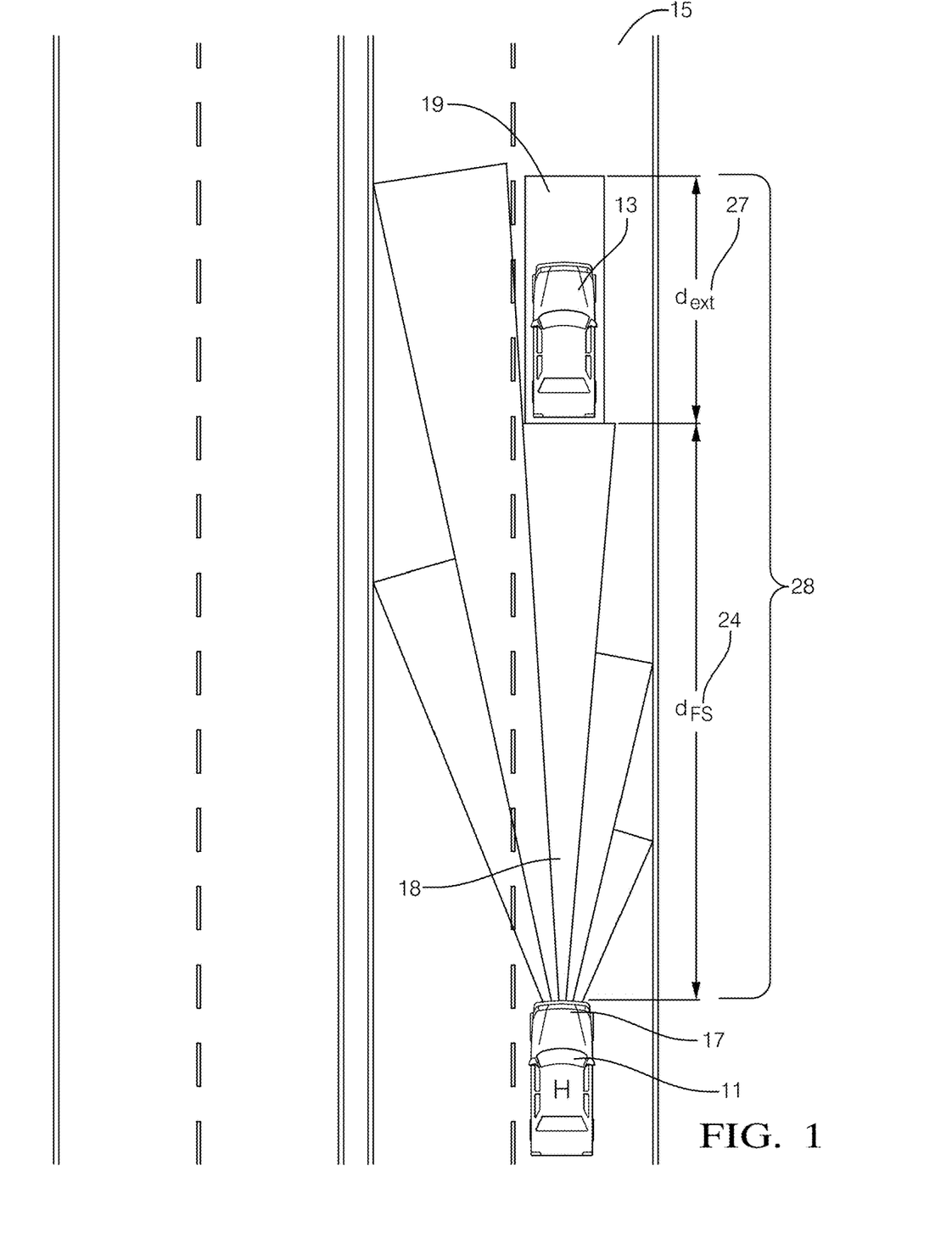
FIG. 1 depicts a host vehicle, a target vehicle being detected as a moving object and the free space there between, FIG. 2 depicts a schematic block diagram of a system for determining a usable distance between the host vehicle and the target vehicle.

FIG. 1 depicts a host vehicle 11 driving behind a target vehicle 13 in the same current lane 15 of a road. The host vehicle 11 includes a detection system 17 for monitoring the environment of the host vehicle 11. The detection system 17 may include a visual system and/or a radar system and/or a LIDAR system being implemented in the host vehicle 11.

Via the detection system 17, the existence and the current velocity of the target vehicle 13 are determined. Therefore, the target vehicle 13 may be regarded as a moving object in front of the host vehicle 11.

The detection system 17 of the host vehicle 11 is further configured to determine an obstacle free space 18 in front of the host vehicle 11. The obstacle free space 18 includes triangular shaped areas which are defined with respect to the host vehicle 11 and obstacles being detected by the detection system 17 in front of the host vehicle 11. From the obstacle free space 18, a minimum distance des with respect to the next obstacle is derived which may be regarded as current obstacle free distance 24 for the host vehicle 11.

According to the present disclosure, the host vehicle 11 also includes a system 21 (see FIG. 2) configured to determine a usable distance 28 between the host vehicle 11 and the target vehicle or moving object 13. The system 21 is able to additionally consider the movement of the target vehicle 13 when estimating a safety distance for the host vehicle 11 which corresponds to the usable distance 28. Based on the movement of the target vehicle 13, the system 21 is configured to estimate an extension 19 (see FIG. 1) for the obstacle free space 18 corresponding to an extension distance $d_{ext}$, 27 for the obstacle free distance $d_{FS}$, 24.

The usable distance 28 is therefore given as the sum of the current obstacle free distance $d_{FS}$, 24 and the extension distance $d_{ext}$, 27. The usable distance may be also regarded as an effective safety distance for the host vehicle 11 taking into account the movement of the target vehicle 13. For vehicles including conventional systems, the current obstacle free distance $d_{FS}$, 24 is simply used as a safety distance for controlling advanced driver assistance systems (ADAS) including lane keeping assistance (LKA), lane change warning (LCW) and side collision warning (SCW). These systems are usually deactivated if the current obstacle free distance $d_{FS}$, 24 falls below a certain predefined limit. In other words, conventional systems do not consider the movement of the target vehicle 13 for the decision whether to deactivate the above-mentioned driver assistance systems.

Due to the movement of the target vehicle 13, however, the driver assistance systems could still be activated in many situations although the obstacle free distance is already below the predefined value or "static safety distance". According to the present disclosure, the current obstacle free distance des is therefore extended by taking the movement of the target vehicle 13 into account without sacrificing the safety requirements for the host vehicle 11.

Figure 2:
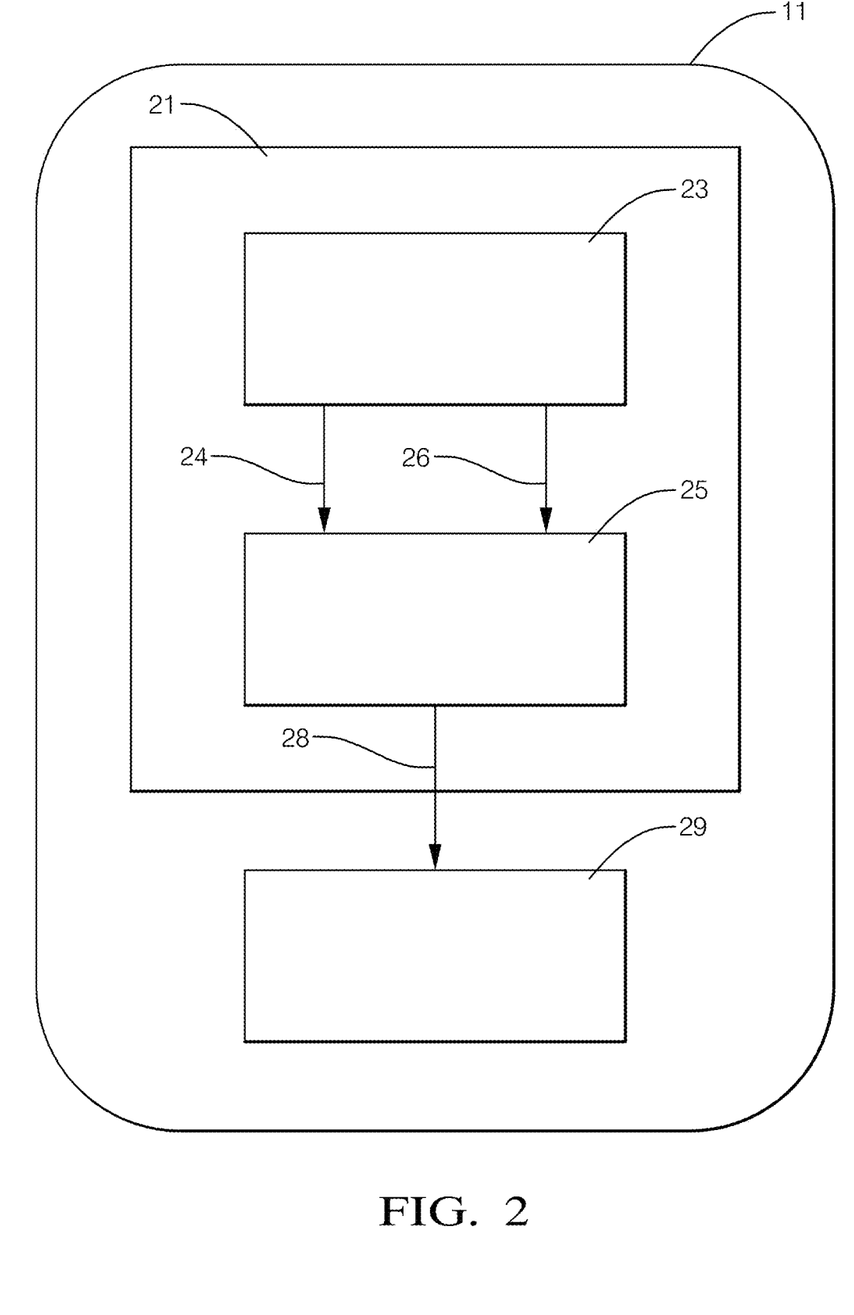

FIG. 2 depicts a schematic diagram of the system 21 for determining the usable distance 28 between the host vehicle 11 and the target vehicle 13 (see FIG. 1) as a moving object in front of the host vehicle 11. The system 21 includes a perception module 23 and a prediction module 25. The perception module 23 is configured to detect the current obstacle free distance $d_{FS}$, 24 in front of the host vehicle 11. The perception module 23 is further configured to determine a current velocity 26 of the moving object or target vehicle 13. The obstacle free distance 24 and the current velocity 26 of the target vehicle 13 are determined based on output data provided by the detection system 17 (see FIG. 1) of the host vehicle 11.

The prediction module 25 receives the current obstacle free distance 24 and the current velocity of the target vehicle 13 from the perception module 23 and is configured to estimate the extension distance 27 based on the current velocity 26 of the moving object or target vehicle 13. The estimation of the extension distance 27 will be described in context of FIGS. 3, 4 and 5 below. The prediction module 25 is further configured to determine the usable distance 28 based on the current obstacle free distance 24 and the extension distance 27. The usable distance 28 is depicted in FIG. 2 as output of the prediction module 25. The usable distance 28 is determined as the sum of the current obstacle free distance 24 and the extension distance 27. As mentioned above, the host vehicle 11 further includes advanced driver assistance systems (ADAS) which are depicted as 29 in FIG. 2. The usable distance 28 is provided by the prediction module 25 for the advanced driver assistance systems 29 in order to decide based on the usable distance 28 whether certain assistance systems like lane keeping assistance (LKA), lane change warning (LCW) and side collision warning (SCW) are to be activated or deactivated.

Figure 5:
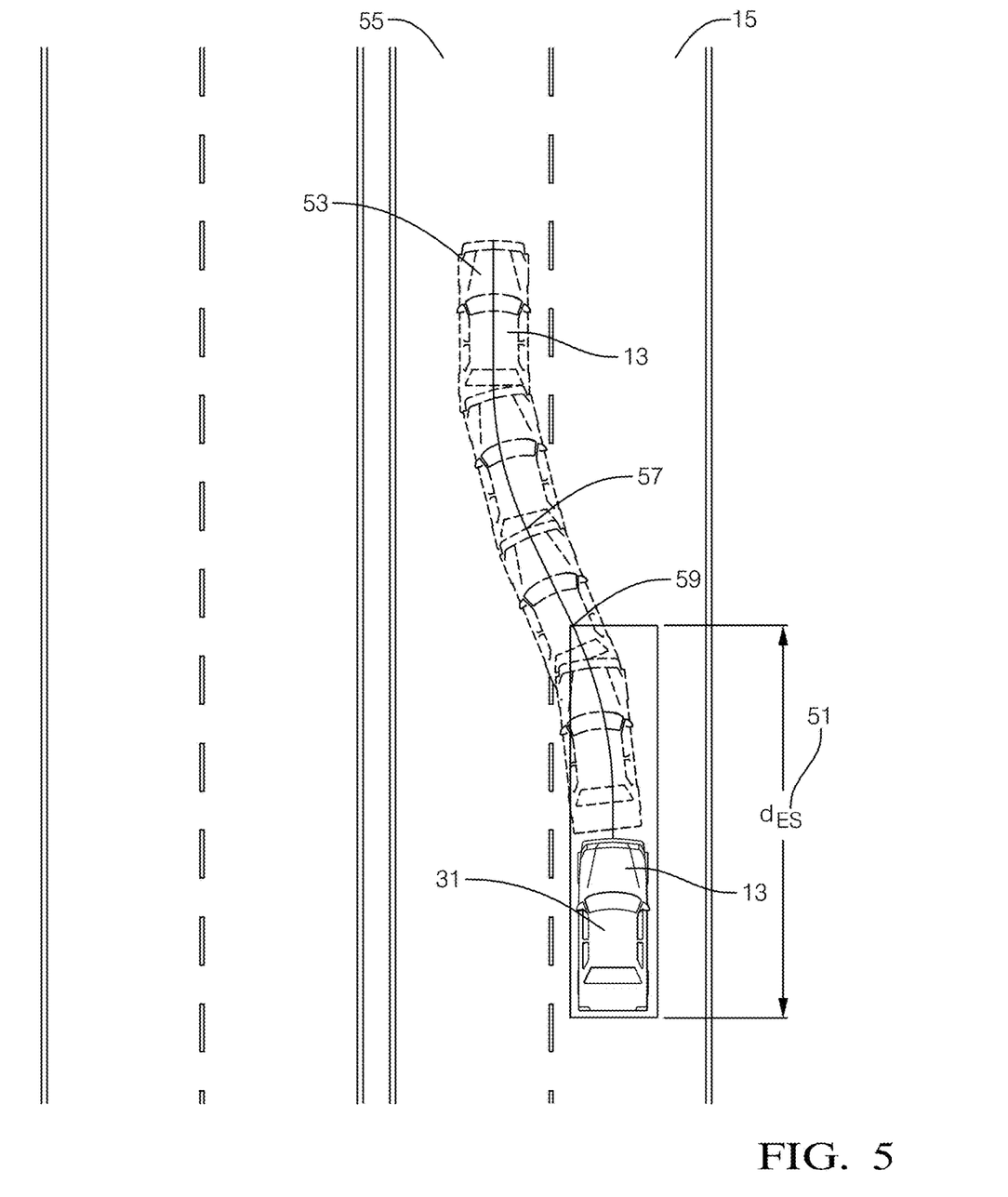
FIG. 5 depicts an emergency steering maneuver of the target vehicle.

In order to estimate the extension distance 27 (see FIG. 1) two types of changes are taken into account for the state of motion of the target vehicle or moving object 13: i) emergency braking, i.e. a change of the state of motion of the target vehicle 13 in longitudinal direction along the current line 15 up to a velocity of almost zero of the target vehicle 13 (see FIG. 3), and ii) emergency steering, i.e. a change of the state of motion of the target vehicle 13 in lateral direction, e.g. in order to avoid a collision with an obstacle in front of the target vehicle 13 (see FIG. 5). Emergency braking and emergency steering may be regarded as "worst cases" for a change of the state of motion of the target vehicle 13, rendering the longest extension distance which still ensures safety for the host vehicle 11. Therefore, the extension distance is estimated as a minimum of an emergency braking distance 35 (see FIG. 3) and an emergency steering distance 51 (see FIG. 5) of the moving object or target vehicle 13 which are each predicted based on a model for the emergency braking and the emergency steering of the target vehicle 13, as will be described in context of FIG. 3 and FIG. 5, respectively.

Figure 3:
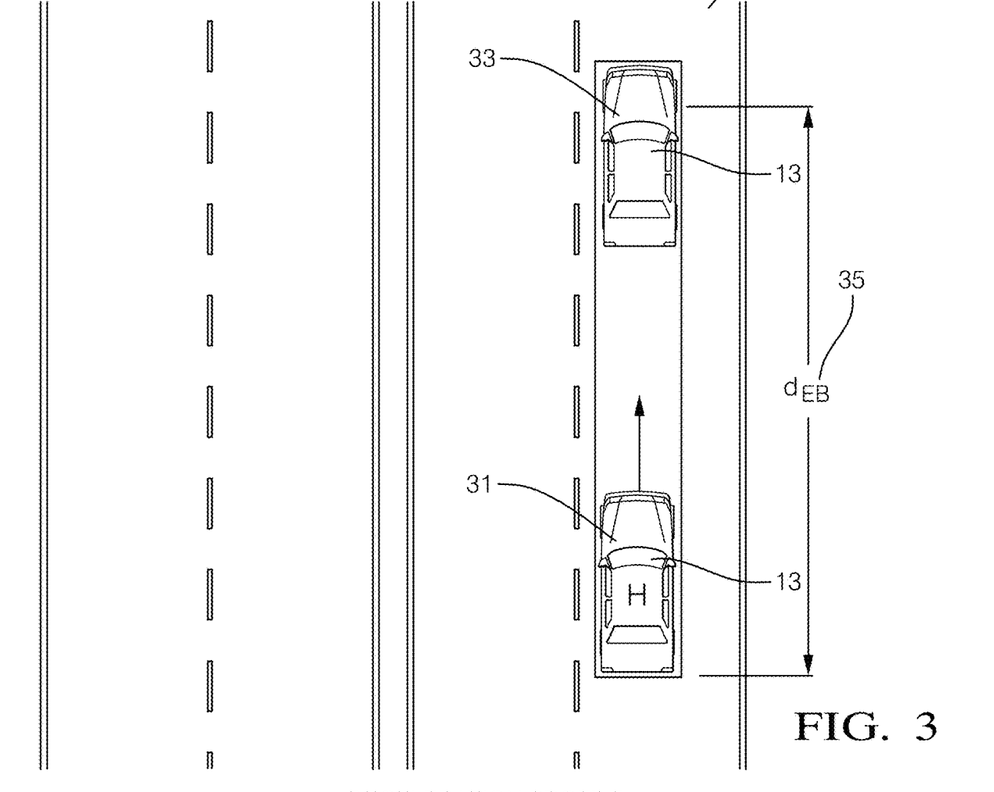
FIG. 3 depicts an emergency braking maneuver of the target vehicle.

FIG. 3 depicts a situation in which the target vehicle 13 performs emergency braking. At the beginning, the target vehicle 13 is at an observed position 31 which corresponds to the position as shown in FIG. 1 in front of the host vehicle 11. That is, the target vehicle 13 is detected by the host vehicle 11 at the position 31 and has a velocity 26 which is also detected by the host vehicle 11 via the detection system 17. In order to predict the emergency braking distance dEB, 35, it is assumed that the target vehicle 13 is at a position 33 after emergency braking and has a velocity of approximately zero.

Figure 4:
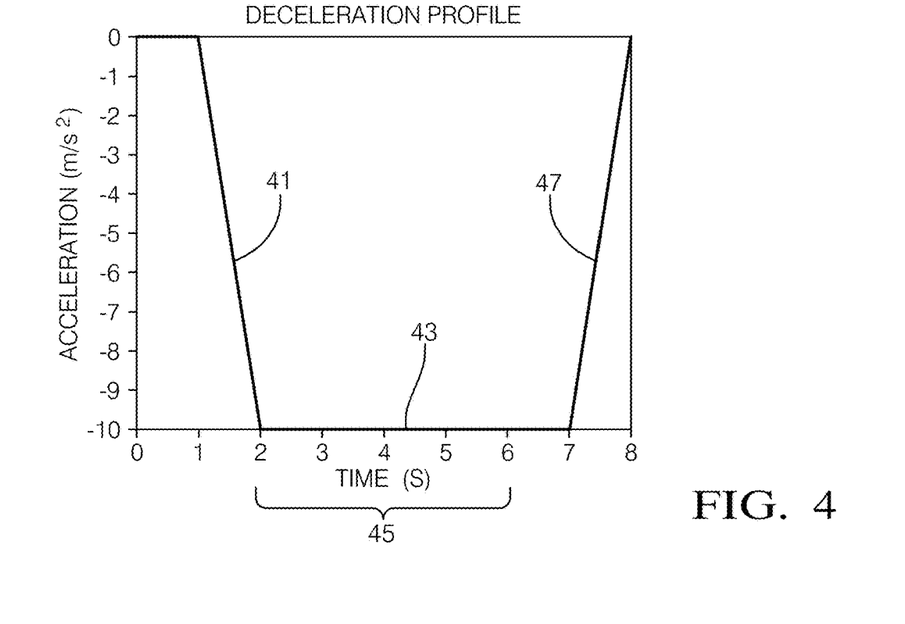
FIG. 4 depicts a braking profile for the emergency braking of the target vehicle.

In detail, the emergency braking distance 35 is predicted based on a deceleration profile for the target vehicle 13 as shown in FIG. 4 which describes the course of the acceleration during emergency braking. In FIG. 4, the acceleration in m/s2 is shown on the y-axis over time in s on the x-axis. The acceleration includes zero or negative values only in order to describe the deceleration of the target vehicle 13 during emergency braking.

At the beginning, e.g. during a reaction time of the driver of the target vehicle 13 of approximately one second, the acceleration is still zero, and thereafter a constant increase 41 of the deceleration (negative acceleration) is assumed up to a value of approximately −10 m/s2. The constant increase 41 of the deceleration corresponds to a constant jerk jstart of the target vehicle 13 at the beginning of the emergency braking. After reaching the maximum deceleration of −10 m/s2, a constant maximum deceleration 43 is assumed for a predetermined time period 45. In the example of FIG. 4, the predetermined time period is about 5 seconds, i.e. from the instant of time at 2 seconds up to the instant of time at 7 seconds. Thereafter, i.e. at 7 seconds, a constant decrease 47 of a deceleration from −10 m/s2 to approximately zero is assumed. The constant decrease of deceleration corresponds again to a constant jerk jend of the target vehicle 13 at the end of the emergency braking.

Based on the deceleration profile as shown in FIG. 4, the emergency braking distance dEB, 35 is calculated as a sum of three partial distances as follows:

$$d\text{ext} = dj\_\text{start} + da\_\text{const} + dj\_\text{end} \quad (1)$$

$d_{j_{start}}$ is the distance which the target vehicle or moving object 13 travels at the beginning of the emergency braking, i.e. during the reaction time and during the constant increase 41 of the deceleration corresponding to the constant jerk of the target vehicle 13. If an initial velocity vin of the target vehicle 13 is given, i.e. as detected by the detection system 17 of the host vehicle 11, the distance travelled by the host vehicle 13 during the beginning of the emergency braking is calculated as follows:

$$d_{j_{start}} = v_{in}\left(t_{react} + t_{j_{start}}\right) + \frac{j_{start} t_{j_{start}}^3}{6} \quad (2)$$

$t_{react}$ and $t_{j_{start}}$ are the reaction time and the elapsed time during the beginning of the emergency braking, respectively, wherein each is e.g. 1 second in the example of FIG. 4, and $j_{start}$ is the constant jerk corresponding to the constant increase 41 of deceleration as shown in FIG. 4.

The second distance $d_{a_{const}}$ is travelled by the target vehicle 13 during a "constant deceleration phase", i.e. during the predetermined time period 45 as shown in FIG. 4 in which the deceleration has the constant value 43. The second distance is calculated as follows:

$$d_{a_{const}} = \left(v_{in} + \frac{j_{start} t_{j_{start}}^2}{2}\right) t_{a_{const}} + \frac{a_{avg} t_{a_{const}}^2}{2} \quad (3)$$

$t_{a_{const}}$ is the predetermined time period 45 for the constant deceleration phase, and aavg is the constant deceleration 43 during this time period 45 (see FIG. 4).

The third distance $d_{j_{end}}$ is travelled by the target vehicle 13 during the end of emergency braking, wherein a constant jerk $j_{end}$ is assumed again corresponding to the constant decrease 47 of deceleration as shown in FIG. 4. The third distance is calculated as follows:

$$d_{j_{end}} = \left(v_{in} + \frac{j_{start} t_{j_{start}}^2}{2} + a_{avg} t_{a_{const}}\right) t_{j_{end}} + \frac{a_{avg} t_{j_{end}}^2}{2} + \frac{j_{end} t_{j_{end}}^3}{6} \quad (4)$$

$t_{j_{end}}$ is the elapsed time during the constant decrease 47 of the deceleration and $j_{end}$ is the constant jerk corresponding to this constant decrease 47 of deceleration.

FIG. 5 depicts the movement of the target vehicle 13 as assumed during emergency steering in order to predict the emergency steering distance $d_{ES}$, 51. At the beginning of the emergency steering, the target vehicle 13 is at the observed position 31 corresponding again to the position of the target vehicle 13 as shown in FIG. 1 and as being detected by the detection system 17 of the host vehicle 11. At the end of the emergency steering, the host vehicle 13 is at a position 53 within an adjacent lane 55, i.e. adjacent to the current lane 15 in which the host vehicle 11 and the target vehicle 13 are currently moving (see FIG. 1).

In order to describe the emergency steering, a trajectory 57 is assumed for the movement of the target vehicle 13 wherein the trajectory 57 includes two curves having a certain constant absolute value for the radius of curvature R, but being opposite to each other regarding the sign. The two curves are connected smoothly such that the trajectory 57 has a unique tangent at a connection point 59 of the two curves.

For the movement of the target vehicle 13, a constant longitudinal velocity $v_{long}$ is assumed which corresponds to the current velocity of the target vehicle 13 as detected by the detection system 17 of the host vehicle 11 and to the initial velocity Vin as assumed at the beginning of the emergency braking (see FIG. 3). Furthermore, a predefined maximum lateral acceleration $a_{lat_{max}}$ is assumed for the target vehicle 13. That is, for the change of the state of motion of the target vehicle 13 in lateral direction the "worst case" is assumed by taking into account the maximum lateral acceleration the target vehicle 13 can achieve. Under these assumptions, the radius of curvature R for the two curves forming the trajectory 57 (see FIG. 5) is calculated as follows:

$$R = v_{long}^2 / a_{lat_{max}} \qquad (5)$$

The emergency steering distance 51 is calculated from the starting position 31 of the target vehicle 13 up to the position 59 at which the target vehicle 13 will have moved half its width laterally when moving to the adjacent lane 55 during emergency steering. The distance 51 up to the position 59 can be considered as free from obstacles for the movement of the host vehicle 11 (see FIG. 1) although the movement of the target vehicle 13 is deteriorated by the emergency steering.

In summary, by considering the possibility of emergency braking and emergency steering for the movement of the target vehicle 13, a minimum extension distance 27 for the current obstacle free distance is estimated based on the emergency braking distance 35 and the emergency steering distance 51 being predicted as described above. Since emergency braking and emergency steering are "worst cases" for the change of the state of motion of the target vehicle 13, the safety for the host vehicle 11 regarding collision avoidance is ensured in spite of the extension 27 of the current obstacle free distance 24. Due to this extension 27, a higher availability for safety functions is provided for the host vehicle 11, including e.g. lane keeping assistance (LKA), lane change warning (LCW), side collision warning (SCW), and for comfort functions like lane centering (LC).

What is claimed is:

1. A method comprising:
    determining a usable distance between a host vehicle and a moving object by at least:
        detecting, via a detection system of the host vehicle, a current obstacle free distance in front of the host vehicle, wherein the current obstacle free distance is limited by a current position of the moving object and wherein the detection system includes at least one of:
            a visual system that is additionally configured to determine a current velocity of the moving object,
            a RADAR system that is additionally configured to determine the current velocity of the moving object, and
            a LIDAR system that is additionally configured to determine the current velocity of the moving object;
        estimating, via a processor of the host vehicle, an extension distance based on:
            the current velocity of the moving object,
            a predicted emergency braking distance of the moving object based on a predefined constant deceleration being applied to the moving object for a predetermined time period and a predefined jerk being applied to the moving object before and after the predetermined time period, the jerk being defined as a rate of change per time period of the deceleration of the moving object, and
            a predicted emergency steering distance of the moving object; and
        determining, via the processor, the usable distance based on the current obstacle free distance and the extension distance; and
    activating or deactivating, based on the usable distance, at least one driver assistance system of the host vehicle.

2. The method according to claim 1, wherein estimating the extension distance comprises determining the extension distance as a minimum of the predicted emergency braking distance and of the predicted emergency steering distance.

3. The method according to claim 1, wherein the predefined jerk has a respective constant absolute value before and after the predetermined time period.

4. The method according to claim 3, wherein the respective constant absolute values of the jerk before and after the predetermined time period are equal.

5. The method according to claim 1, wherein estimating the emergency steering distance comprises estimating the emergency steering distance based on a predefined maximum lateral acceleration of the moving object.

6. The method according to claim 5, wherein estimating the emergency steering distance comprises estimating the emergency steering distance based on a predefined shape of a trajectory of the moving object during emergency braking.

7. The method according to claim 6, wherein the trajectory comprises two curves having a predefined radius of curvature being opposite to each other and being smoothly connected such that the trajectory has a unique tangent at a connection point of the two curves.

8. The method according to claim 1, wherein estimating the emergency steering distance comprises estimating the emergency steering distance with respect to a predicted position of the moving object at which the moving object will have moved half its width laterally during emergency steering.

9. A system, the system comprising:
    at least one processor configured to:
        determine a usable distance between the system and a moving object by at least:
            obtaining a current obstacle free distance in front of the system, wherein the current obstacle free distance is limited by a current position of the moving object, and based on a detection system including at least one of:
                a visual system that is additionally configured to determine a current velocity of the moving object,
                a RADAR system that is additionally configured to determine the current velocity of the moving object, and
                a LIDAR system th at s additionally configured to determine the current velocity of the moving object;
            estimating an extension distance based on:
                the current velocity of the moving object, a predicted braking distance of the moving object based on a predefined constant deceleration of being applied to the moving object for a predetermined time period and a predefined jerk being applied to the moving object before and after the predetermined time period, the jerk being defined as a rate of change per time period of the deceleration of the moving object, and a predicted emergency steering distance of the moving object; and determining the usable distance based on the current obstacle free distance and the extension distance; and activate or deactivate, based on the usable distance, at least one driver assistance system of the system.

10. The system according to claim 9, wherein the processor is configured to obtain the current obstacle free distance in front of the system from the detection system.

11. The system according to claim 9, wherein the processor is configured to obtain the current velocity of the moving object from the detection system.

12. A non-transitory computer readable medium comprising instructions that when executed by a processor of a computer system, configure the processor to:

determine a usable distance between a host vehicle and a moving object by at least:

obtaining a current obstacle free distance in front of the host vehicle, wherein the current obstacle free distance is limited by a current position of the moving object, and based on a detection system including at least one of:

a visual system that is additionally configured to determine a current velocity of the moving object, a RADAR system that is additionally configured to determine the current velocity of the moving object, and a LIDAR system that is additionally configured to determine the current velocity of the moving object;

estimating an extension distance based on:

the current velocity of the moving object, a predicted braking distance of the moving object based on a predefined constant deceleration of being applied to the moving object for a predetermined time period and a predefined jerk being applied to the moving object before and after the predetermined time period, the jerk being defined as a rate of change per time period of the deceleration of the moving object, and a predicted emergency steering distance of the moving object; and determining the usable distance based on the current obstacle free distance and the extension distance; and activate or deactivate, based on the usable distance, at least one driver assistance system of the host vehicle.

13. The non-transitory computer readable medium according to claim 12, wherein the instructions, when executed, configure the processor to estimate the extension distance by determining the extension distance as a minimum of the predicted emergency braking distance and of the predicted emergency steering distance.

14. The non-transitory computer readable medium according to claim 12, wherein the instructions, when executed, configure the processor to estimate the extension distance by predicting the emergency braking distance based on the predefined constant deceleration being applied to the moving object for the predetermined time period.

15. The non-transitory computer readable medium according to claim 12, wherein the instructions, when executed, configure the processor to estimate the extension distance by estimating the emergency steering distance based on a predefined maximum lateral acceleration of the moving object.

16. The system according to claim 9, the processor is configured to estimate the emergency braking distance by at least:

predicting the emergency braking distance based on the predefined constant deceleration being applied to the moving object for the predetermined time period.

17. The system according to claim 9, wherein the processor is configured to estimate the emergency steering distance by at least:

estimating the emergency steering distance with respect to a predicted position of the moving object at which the moving object will have moved half its width laterally during emergency steering.

18. The system according to claim 9, wherein the predefined jerk has respective constant absolute values before and after the predetermined time period.

19. The system according to claim 18, wherein the respective constant absolute values of the jerk before and after the predetermined time period are equal.

* * * * *

UNITED STATES PATENT AND TRADEMARK OFFICE
CERTIFICATE OF CORRECTION

| | |
|---|---|
| PATENT NO. | : 12,128,885 B2 |
| APPLICATION NO. | : 17/195536 |
| DATED | : October 29, 2024 |
| INVENTOR(S) | : Markus Pär Oscar Carlander et al. |

Page 1 of 1

It is certified that error appears in the above-identified patent and that said Letters Patent is hereby corrected as shown below:

In the Claims

Column 10, Line 13: In Claim 1, after "object;", delete "and"

Column 10, Line 63: In Claim 9, delete "th at s" and insert --that is-- therefor Signed and Sealed this
Fifteenth Day of April, 2025

Coke Morgan Stewart
*Acting Director of the United States Patent and Trademark Office*